United States Patent [19]
Sutcliffe et al.

[11] Patent Number: 5,857,193
[45] Date of Patent: Jan. 5, 1999

[54] CENTRALIZED AUDIOTEXT POLLING SYSTEM

[76] Inventors: Andrew B. Sutcliffe, 11 Coburn Rd., Tyngsboro, Mass. 01879; Charles J. Willett, 458 Elm St. East, Raynham, Mass. 02767; Scott M. Schultz, 50 Mollie Dr., Tewksbury, Mass. 01876

[21] Appl. No.: 876,009

[22] Filed: Jun. 13, 1997

[51] Int. Cl.⁶ .................................................. G06F 17/30
[52] U.S. Cl. ............................ 707/10; 707/1; 707/8; 707/200; 707/201; 707/202; 707/203; 707/204; 707/104; 704/278; 705/14; 455/427; 395/185.07
[58] Field of Search .................................. 707/1, 8, 200, 707/201, 202, 203, 204; 704/278; 705/14, 10; 455/427; 395/185.07

[56] References Cited

U.S. PATENT DOCUMENTS

| | | | |
|---|---|---|---|
| Re. 30,579 | 4/1981 | Goldman et al. | 340/825.33 |
| Re. 30,580 | 4/1981 | Goldman et al. | 340/825.33 |
| 4,651,150 | 3/1987 | Katz et al. | 340/825.34 |
| 4,739,322 | 4/1988 | Katz et al. | 340/825.34 |
| 4,792,968 | 12/1988 | Katz | 379/92.03 |
| 4,816,824 | 3/1989 | Katz et al. | 340/825.34 |
| 4,845,739 | 7/1989 | Katz | 379/92.03 |
| 4,930,150 | 5/1990 | Katz | 379/93.03 |
| 4,932,046 | 6/1990 | Katz et al. | 379/32 |
| 4,939,773 | 7/1990 | Katz | 379/204 |
| 4,987,590 | 1/1991 | Katz | 379/204 |
| 5,014,298 | 5/1991 | Katz | 379/93.12 |
| 5,016,270 | 5/1991 | Katz | 379/92.03 |
| 5,048,075 | 9/1991 | Katz | 379/92.03 |
| 5,073,929 | 12/1991 | Katz | 379/93.12 |
| 5,091,933 | 2/1992 | Katz | 379/204 |
| 5,109,404 | 4/1992 | Katz et al. | 379/88.25 |
| 5,128,984 | 7/1992 | Katz | 379/92.03 |
| 5,185,787 | 2/1993 | Katz | 379/204 |
| 5,218,631 | 6/1993 | Katz | 463/41 |
| 5,224,153 | 6/1993 | Katz | 379/93.12 |
| 5,251,252 | 10/1993 | Katz | 379/92.03 |
| 5,255,309 | 10/1993 | Katz | 379/88.09 |
| 5,259,023 | 11/1993 | Katz | 379/88.09 |
| 5,297,197 | 3/1994 | Katz | 379/204 |
| 5,349,633 | 9/1994 | Katz | 379/88.09 |
| 5,351,285 | 9/1994 | Katz | 379/93.14 |
| 5,359,645 | 10/1994 | Kat | 379/93.12 |
| 5,365,575 | 11/1994 | Kat | 379/93.13 |
| 5,412,708 | 5/1995 | Katz | 348/14 |
| 5,442,688 | 8/1995 | Katz | 379/156 |
| 5,495,284 | 2/1996 | Katz | 348/15 |
| 5,553,120 | 9/1996 | Katz | 379/88.09 |
| 5,561,707 | 10/1996 | Katz | 379/88.16 |
| 5,592,618 | 1/1997 | Micka et al. | 395/185.07 |
| 5,596,744 | 1/1997 | Dao et al. | 707/10 |
| 5,701,457 | 12/1997 | Fujiwara | 395/608 |
| 5,737,725 | 4/1998 | Case | 704/260 |
| 5,740,549 | 4/1998 | Reilly et al. | 705/14 |
| 5,758,323 | 5/1998 | Case | 704/278 |

*Primary Examiner*—Paul R. Lintz
*Assistant Examiner*—Srirama Channavajjala
*Attorney, Agent, or Firm*—Nutter, McClennen & Fish, LLP

[57] ABSTRACT

A data transfer system for transferring between a plurality of data storage devices is provided. A data transfer request system requests scheduled and unscheduled data transfers between respective ones of the data storage devices. A first database stores entries corresponding to scheduled data transfer request and a second database stores entries corresponding to unscheduled data transfer requests. A scheduler updates the entries in the first and second databases on a predetermined interval. A file transfer system accesses the entries in the first and second databases and transfer data between the data storage devices according to information in the database entries.

28 Claims, 15 Drawing Sheets

| MACHINE | LOCATION | SUN | MON | TUE | WED | THUR | FRI | SAT | REMOTE FLAG | QUEUE | RETRIES |
|---|---|---|---|---|---|---|---|---|---|---|---|
| AUST | 5124199897 | 00 | 00 | 00 | 06 | 00 | 00 | 00 | ✓ | 0 | 3 |
| ILLI | 6302269652 | 00 | 05 | 00 | 00 | 00 | 00 | 00 | ✓ | 0 | 3 |
| LI | 5163960034 | 00 | 05 | 00 | 00 | 00 | 00 | 00 | ✓ | 0 | 3 |
| MIAM | 3057168744 | 00 | 05 | 00 | 00 | 00 | 05 | 00 | ✓ | 0 | 3 |
| MLPC | 4142233183 | 00 | 00 | 00 | 00 | 05 | 00 | 00 | ✓ | 0 | 3 |
| OMAH | 4025540649 | 00 | 00 | 00 | 06 | 00 | 00 | 00 | ✓ | 0 | 3 |
| ORLA | 4074206812 | 00 | 00 | 00 | 00 | 00 | 00 | 00 | ✓ | 0 | 3 |
| PORT | 2077725425 | 00 | 07 | 00 | 07 | 00 | 00 | 00 | ✓ | 0 | 3 |
| SCA1 | 7023341275 | 00 | 00 | 00 | 06 | 00 | 05 | 00 | ✓ | 0 | 3 |
| SPUN | 4135351351 | 00 | 00 | 06 | 00 | 00 | 00 | 00 | ✓ | 0 | 3 |
| SPVA | 4138270970 | 00 | 00 | 00 | 00 | 00 | 05 | 00 | ✓ | 0 | 3 |
| TULS | 9185858792 | 00 | 00 | 00 | 00 | 05 | 00 | 00 | ✓ | 0 | 3 |
| VIRG | 7039174179 | 00 | 00 | 00 | 00 | 00 | 00 | 00 | ✓ | 0 | 3 |

*Figure 3*

| ORDER FILE | LOCATION | REMOTE FLAG | QUEUE | RETRIES | REMOTE FLAG |
|---|---|---|---|---|---|
| H:\CAPS\ADTK\1234.ORD | 7023341275 | H:\CAPS\ADTK\ | 1 | 3 | ✓ |
| H:\CAPS\ADTK\2000.CAN | 2058332192 | H:\CAPS\ADTK\ | 1 | 3 | ✓ |
| H:\CAPS\APIS\7777.ORD | 6174508767 | H:\CAPS\APIS\ | 1 | 3 | ✓ |

*Figure 4B*

CENTRALIZED AUDIOTEXT POLLING SYSTEM

STATEMENT REGARDING FEDERALLY SPONSORED RESEARCH

Not Applicable.

CROSS REFERENCE TO RELATED APPLICATION

Not Applicable.

FIELD OF THE INVENTION

The present invention relates generally to systems for transferring data, and more particularly to a centralized data transfer system for transferring data between data storage devices systems.

BACKGROUND OF THE INVENTION

A system having a plurality of devices between which data is transferred can have certain disadvantages associated therewith, and in particular for remotely located data storage devices. For example, an personal advertisement system can have many devices that must exchange data. Such a system can have call centers for obtaining information from individuals wishing to place a personal advertisement. An information system can maintain and control user information, billing information, and profile data, for example. An audiotext ad-taker system can obtain personal advertiser information via phone. The system can include a plurality of machines, or audiotext systems, for storing personal advertisement information, such as voice greetings and ad responses. The devices in this system can be locally networked to enable data communication between the described systems and devices.

However, in the case where there is a plurality of remotely located audiotext systems, distributed across the country for example, the costs associated with direct and continuous data communication with the audiotext systems is significant. The audiotext systems can be placed in manual modem communication to obtain information as desired. This arrangement requires considerable human, and therefore slow, costly and inaccurate interaction with the device requesting the information and the audiotext system.

Data can be obtained from the remote devices via modem under the control of the information system and ad-taker system. However, the information and ad-taker system may attempt to access the same remote device at the same time, thus wasting time and possibly degrading data transfer integrity. In addition, information obtained from the remote systems can be stored on a network location, such as server, that is accessible to the data requestor. Thus, the data requestor can access the data at a convenient time. However, where there are multiple data requestors, such as the information system and an adtaker system, there may be contention for the network data storage location for simultaneous data transfer requests. This can result in undesirable and costly data loss and corruption.

SUMMARY OF THE INVENTION

The present application provides a system for transferring data between a plurality of data storage devices. A data transfer request system requests a scheduled or unscheduled data transfer with one or more of the data storage devices. A scheduler updates entries in a first database corresponding to scheduled data transfer requests and entries in a second database corresponding to unscheduled data transfer requests. A file transfer system coupled to the first and second databases accesses the respective entries and transfers data from the data storage devices in accordance with information in the entries.

In one embodiment, the data transfer request system includes at least first and second data transfer requestors that request data transfer between a remote data storage device, such as an audiotext system in modem communication with the data transfer request system and a network data storage location. The first data transfer requestor provides the scheduled data transfer requests and the first and second requestors request unscheduled data transfer requests. The scheduler updates the first and second databases with the respective scheduled and unscheduled data transfer requests. The file transfer request system includes a scheduled file transfer system that examines the first database for scheduled data transfer request entries and an unscheduled file transfer system that examines the unscheduled database for unscheduled data transfer request entries.

This arrangement provides a centralized data transfer system for processing and conducting data transfers between the data storage devices. The data transfer system stores the scheduled data transfer requests in a scheduled database and unscheduled data transfer requests in an unscheduled database for processing and transferring data in an orderly and efficient manner. Having the unscheduled data transfer requests stored in the unscheduled database allows the file transfer system to eliminate data storage location contention for the case where multiple data transfer requestors request simultaneous data transfer, or request data transfer from the same remote data storage device.

In another aspect of the invention, a method of transferring data between a plurality of data storage devices includes storing a plurality of entries corresponding to scheduled data transfer requests in a first database and storing a plurality of entries corresponding to unscheduled transfer requests in a second database. The respective entries in the first and second databases are updated periodically and data is transferred from respective ones of the plurality of data storage devices based on information in the entries in the first and second databases.

In one embodiment, the scheduled data transfer requests are obtained from a data transfer request system and stored in the first database. Unscheduled data transfer requests can be generated by one or more of first and second data transfer requestors forming a portion of the data transfer request system. At least one network accessible data storage device location is examined for the presence of unscheduled data transfer requests. If any are found the entries in the second database are updated accordingly to the unscheduled data transfer requests. The second database is examined at predetermined intervals to determine if there are entries indicating an unscheduled data transfer request that is to be executed. If such an entry is found data is transferred between data storage devices according to the respective entry in the database. In an exemplary embodiment, the first database is accessed to extract data storage device location information to effect the unscheduled data transfer.

The first database is likewise examined at predetermined intervals to determine if there are scheduled data transfer request that are to be carried out at the present time. If such requests are found, the data is transferred in accordance with the information in the respective entry in the first database.

Effecting the data transfer requests in this manner eliminates more than one data requestor attempting to transfer data from the same data storage device at the same time. An illustrative scheduled data transfer includes a transfer from a remote data storage device in the form of an audiotext system connected via modem, to a local data storage device in the form of a network server. Storing and accessing the scheduled and unscheduled data transfer requests from the respective first and second databases prevents contention for the network location and attempted simultaneous access of a particular data storage device by more than one device.

BRIEF DESCRIPTION OF THE DRAWINGS

The foregoing features of this invention as well as the invention itself may be more fully understood from the following detailed description of the drawings, in which:

FIG. 3 is a pictorial diagram of a scheduled database forming a portion of the centralized audiotext polling system shown in FIG. 2;

FIG. 4B is a pictorial diagram of an unscheduled database forming a portion of the centralized audiotext polling system shown in FIG. 2;

DETAILED DESCRIPTION OF THE INVENTION

Figure 1:
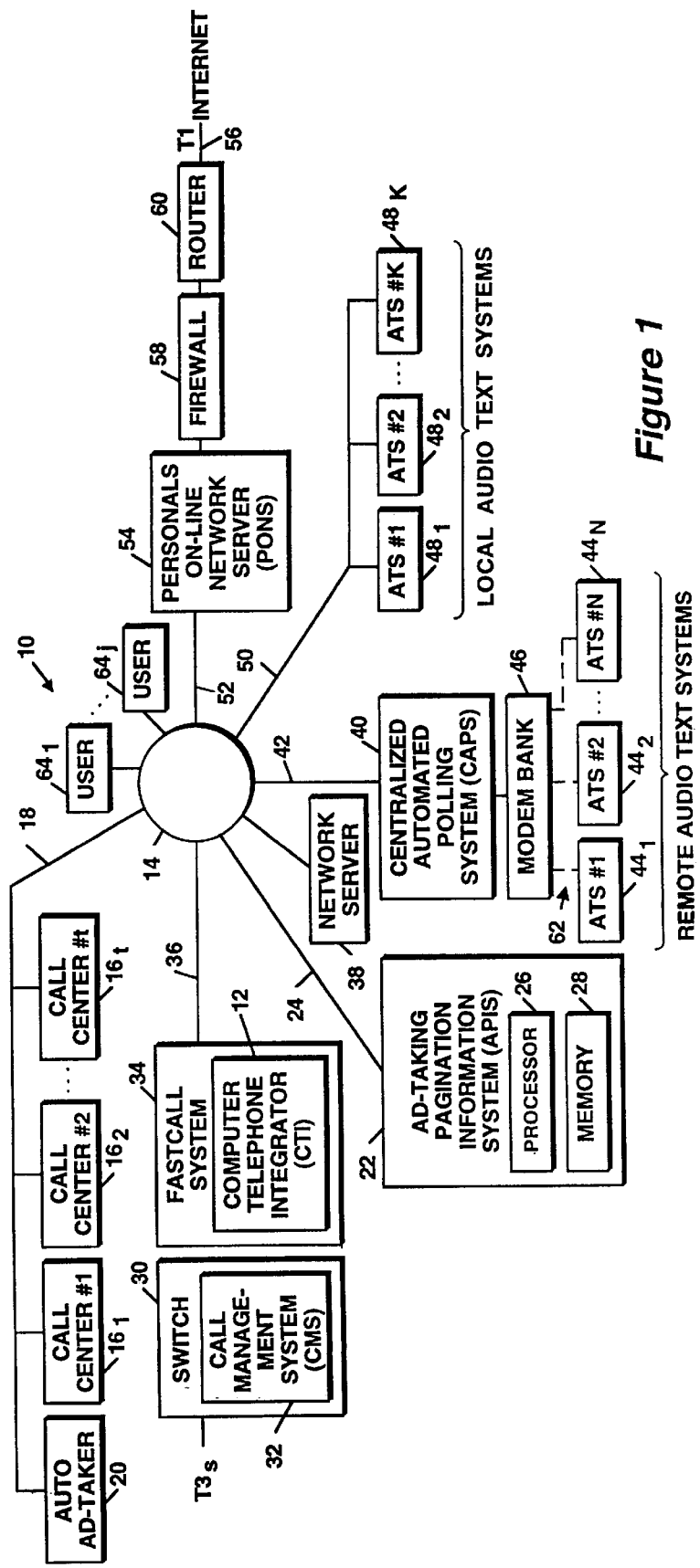
FIG. 1 is a block diagram of a network for placing and responding to personal ads including a centralized audiotext polling systems in accordance with the present invention.

Referring to FIG. 1, a network 10 for receiving personal advertisements ("personals"), storing the personals and storing responses to the personals is shown. While the present invention is described with particular reference to apparatus and methods for processing personal ads, it will be appreciated by those of ordinary skill in the art that various data and text can be processed by the network 10 and techniques described and claimed herein. Further, the particular network apparatus and architecture is illustrative only and can be varied as will be appreciated by those of ordinary skill in the art without departing from the spirit of the invention.

The network 10 is used by a vendor to collect, store, process and distribute personals to one or more clients. The network 10 includes a vendor network 14, which in the illustrative embodiment, is a Local Area Network (LAN) 14, to which components are connected for communication.

A plurality of call centers $16_f$–$16_t$ for receiving personal ads via telephone lines are coupled to the vendor network 14 via a communication link 18, such as an Ethernet link. Each of the call centers $16_f$–$16_t$ includes a telephone line and a personal computer, or workstation at which an operator (referred to alternatively as an ad taker) is stationed. The ad taker answers telephone calls from individuals seeking to place personal ads and enters information gathered from the advertiser onto the call center computer.

When an operator answers a telephone call, one or more ad taking screens appear on the display of the call center computer. The ad taking screen includes a field in which the client (newspaper) for which the ad is being placed is identified and, further, includes a plurality of fields that the ad taker completes in response to information provided by the advertiser. As examples, the advertiser provides his or her name, address, telephone number, e-mail address (if any), category of ad sought to be placed (e.g., female seeking male non-smoker, etc.), and answers to certain survey questions that the ad taker may ask. The survey questions may be developed by and for the benefit of the vendor and/or the particular client.

Also coupled to the communication link 18 is an audiotext ad taker 20 by which personal ads can be placed via an audiotext telephone system. That is, a caller to the audiotext ad taker 20 is prompted by a voice recording to answer a series of questions. The caller's answers are recorded and later transcribed and input onto ad taking screens.

Personal ads placed via the call centers $16_f$–$16_t$ or the audiotext ad taker 20 are stored in a database of an Ad Taking Pagination Information System (APIS) 22, referred to alternatively as an ad taking system, which is coupled to the vendor network 14 via a communication link 24, such as an Ethernet link. More particularly, APIS 22 includes a memory 28 in which the database is stored and a processor 26 on which a program for managing certain operations of the personals network 10 is executed. In the illustrative embodiment, APIS 22 is implemented on an Alpha computer sold by Digital Equipment Corporation.

APIS 22 can include an operating system for the processor 26 which, in the illustrative embodiment, is the Windows NT system of Microsoft. Also provided in APIS is an application program for execution on the processor 26, which in an illustrative embodiment, is an application program written in the Dexterity software language. A database is stored in the APIS memory 28. In the illustrative embodiment, the database is provided by a software package from Faircom.

Also coupled to the vendor network 14 is telephone access apparatus, including a telephone switch 30 and a Fastcall system 34. The telephone switch 30 is of the type sold by AT&T and includes a Call Management System (CMS). The switch 30 is coupled between a plurality of T3 telephone lines and the Fastcall system 34 and processes incoming telephone calls before routing the calls to the Fastcall system 34 and to an appropriate one of the call centers $16_f$–$16_t$.

The vendor network 14 may be further coupled to the Internet for providing Internet access to personals ads placed via the call centers $16_f$–$16_t$. More particularly, the vendor may maintain a web site for one or more of its clients on the Internet. To this end, a Personals On-line Server (PONS) 54 is provided for coupling to a T1 line 56 to the Internet, typically via a firewall 58 and a router 60, as shown. Personal ads are posted on the web site via the server 54.

One or more user machines $64_f$–$64_j$ located at the vendor's facility are coupled to the vendor network 14 for purposes of maintenance, monitoring and updating the system. Such user machines $64_f$–$64_j$ typically take the form of personal computers.

A plurality of local Audio Text System (ATS) machines $48_1$–$48_K$ are coupled to the vendor network 14 via a first communication link 50, such as a LAN. Thus, the local ATS $48_1$–$48_K$ are accessible over the network 14. The ATS machines permit telephone responses to the personals published by the vendor's clients to be recorded, stored and accessed by the advertiser. To this end, each of the ATS machines $48_1$–$48_K$ includes a telephone interface to a plurality of POTS lines and T1 lines, a processor, media for recording and storing voice messages and a data connection to the vendor network 14 is achieved. The ATS machine provides database storage of voice greetings and other user information.

A Centralized Audiotext Polling System (CAPS) 40 is coupled to the network via a second communication link 42, such as an Ethernet link. CAPS 40 is coupled to a modem bank 46 providing dial up communication with a plurality of remote ATS machines $44_1$–$44_N$. In one embodiment, the modem bank is a plurality of modems. Thus, the remote ATS $44_1$–$44_N$ are coupled to the vendor network 14 via CAPS. It will be appreciated that the remote ATS $44_1$–$44_N$ could be networked, via ISDN line for example, to provide continuous and direct data communication with the network 14. However, such a connection would be many times more expensive than the dial up arrangement as shown.

A network server 38 provides data storage that is accessible via the network 14. Thus, in addition to direct network communication, APIS 22 and CAPS 40 can communicate via storing a file at a known location on the server 38 so that the other can access the location to retrieve the file at a later time.

In an illustrative embodiment, there are on the order of thirteen local ATS $44_1$–$44_N$ machines and on the order of eighty remote ATS machines $48_1$–$48_K$. However, it will be appreciated by those of ordinary skill in the art that the number of ATS machines, both local and remote, is a function of the number of clients to be serviced by the vendor, their geographic locations, as well as any limitations of the vendor network 14.

CAPS 40 communicates with the ATS machines 44,48 for the purpose of obtaining certain statistical information for use in verifying client profiles used in text production. Production refers to the accumulation and any processing of personal ad text by the vendor and the presentation of such text to a client. A client profile includes a description of various parameters associated with text to be provided to the particular client, as will be discussed.

APIS 22 can request CAPS 40 to obtain status data from remote ATS 44 at scheduled times, which can be a function of the timing of production. APIS 22 and other systems, such as Ad-taker 20, can also request CAPS to transfer data with a particular remote ATS at any given time. For example, CAPS 40 communicates with the ATS machines at the request of APIS 22 for the purpose of obtaining box numbers and security codes to provide to advertisers. Such a request would typically be an unscheduled request. In one embodiment, APIS 22 stores one or more "box pools" for each of its clients, with each box pool including a list of available box numbers and security codes. The box pools are replenished by APIS 22 sending request files to CAPS 40 at a designated network location, which conveys the requests to the appropriate ATS machines and completes the request by making return files available for retrieval by APIS at the same or different location.

Figure 2:
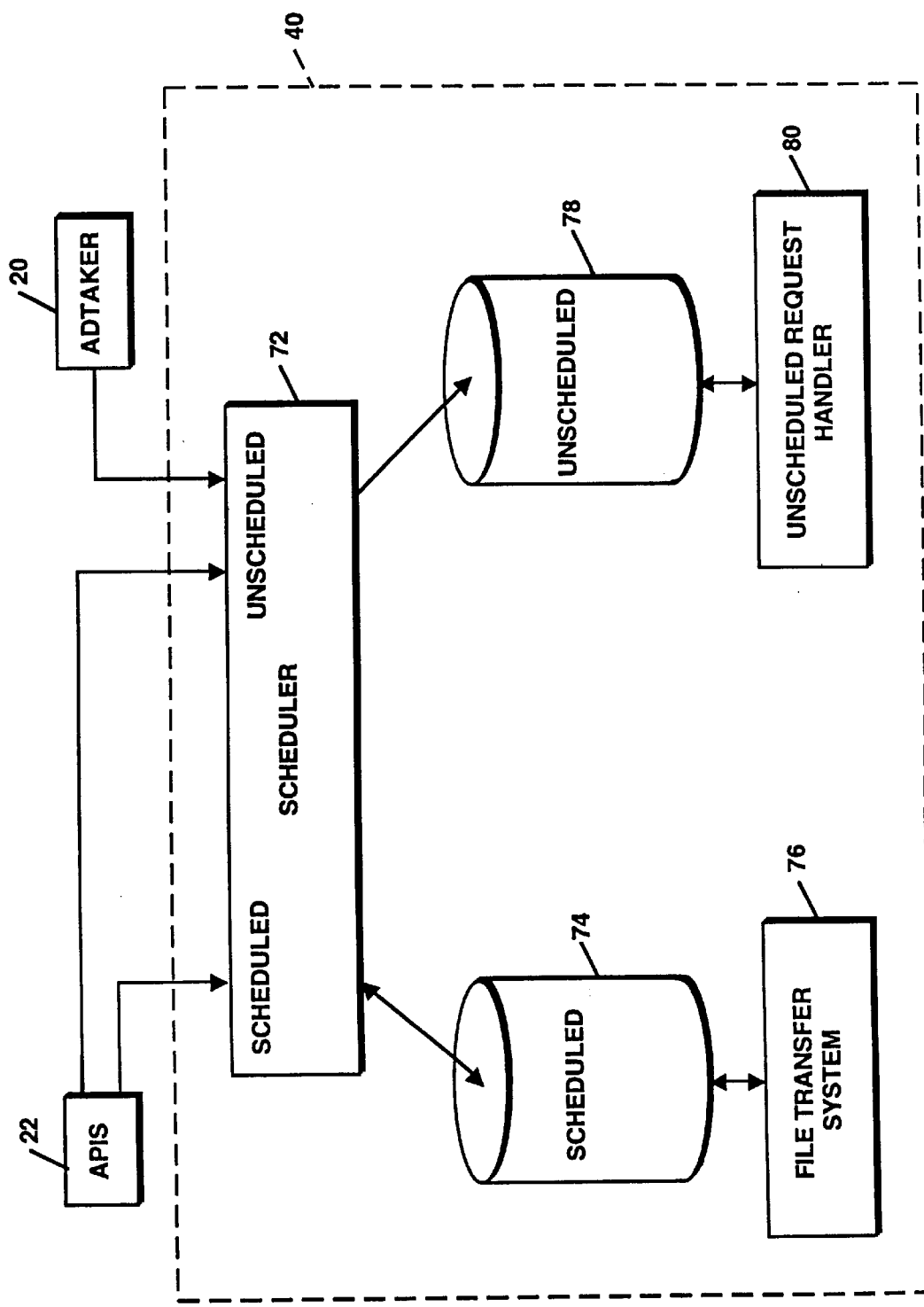
FIG. 2 is a top level block diagram of the centralized audiotext polling system of FIG. 1.

Referring to FIG. 2, the Centralized Audiotext Polling System (CAPS) 40 includes a scheduler 72 which interfaces with the APIS 22 and the Adtaker System 20. CAPS 40 includes a first database 74 having therein the names and locations of all ATS Systems 44, 48. The scheduler 72 receives from APIS 22 an .INI file which includes locations of all ATS Systems including the remote ATS Systems 44 and local ATS Systems 48. This .INI file provided from APIS 22 provides the scheduler 72 with the particular dates and times at which the remote ATS Systems 44 should be accessed for file transfer purposes. Thus, predetermined ones of the ATS Systems 44 have scheduled times at which data should be transferred from the ATS Systems to the APIS. Such data transfers are accomplished by a file transfer system 76 provided as part of CAPS 40. The particular manner in which such file transfers are accomplished will be described here and below in conjunction with FIGS. 4 through 6. Suffice it here to say that CAPS 40 initiates and ensures the safe transfer of information from ATS Systems 44 to APIS 22.

It should be noted that only the remote audiotext systems 44 have files transferred at scheduled times. This is due primarily to the fact that remote ATS systems 44 are not directly networked, but rather are accessed through a modem bank as explained above in conjunction with FIG. 1. Thus, it is necessary for CAPS 40 to retrieve the status information from the ATS Systems 44 and then store the status files in a directory on network server 38. CAPS 40 stores the files in a particular directory on the server for their retrieval by the APIS 22.

It should also be noted that local ATS systems 48 do not utilize CAPS 40 for the scheduled transfer of files since local ATS Systems 48 are coupled directly to network 14. Thus, the local systems directly store status files or reports on the network server. In one embodiment, each machine has a particular network directory for storing files from the respective machine. Such storage of status files by a local ATS Systems 48, however, is accomplished without the aid of CAPS 40 in an exemplary embodiment.

Referring now to FIG. 3, a Table 82 found in scheduled database 74 includes a first column 84 containing machine IDs and a second column 86 specifying a location of the particular ATS machine. It should be noted that the location is specified via a network location or a phone number depending upon whether the ATS machine is a local or remote machine, respectively. A day field 88 is utilized to specify a time or a particular date at which a remote ATS System is to be accessed. For example, entry 88A indicates that machine AUST is accessed at 0600 hours on Wednesday. Table 82 further includes a remote flag field 90, a queue column 92, and a retries column 94. The purpose of each of these fields will be explained in detail further below in conjunction FIGS. 4 through 6.

Figure 3A:
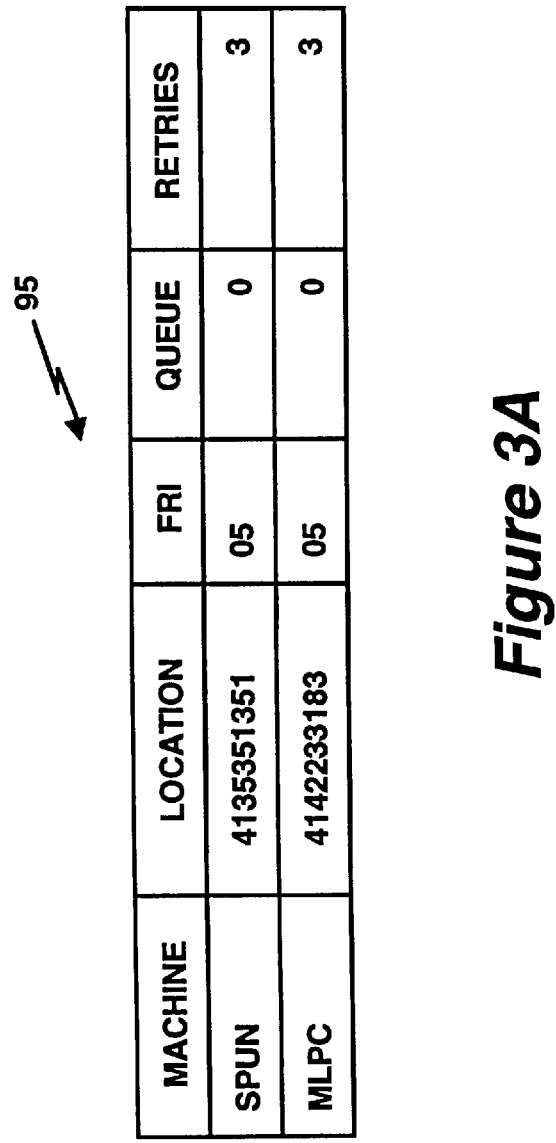
FIG. 3A is an exemplary REM table derived from the scheduled database of FIG. 3.

FIG. 3A shows an exemplary REM table 95 created from the scheduled database 74. The REM table 95 contains entries for one day, such as Friday as shown. The REM table 95 contains the same fields as the scheduled database 74 except for the remote flag and only entries for one day are contained therein. The REM table 95 provides a working table for one days entries that is updated as described below. By creating the REM table 95, the scheduled database 74 need not be periodically queried, updated and possibly corrupted. In a further embodiment a LOC table can be created on a daily basis to store entries corresponding to scheduled data transfer requests with respect to local ATS machines. The LOC table would contain network locations instead of telephone numbers as in the REM table.

Figure 4:
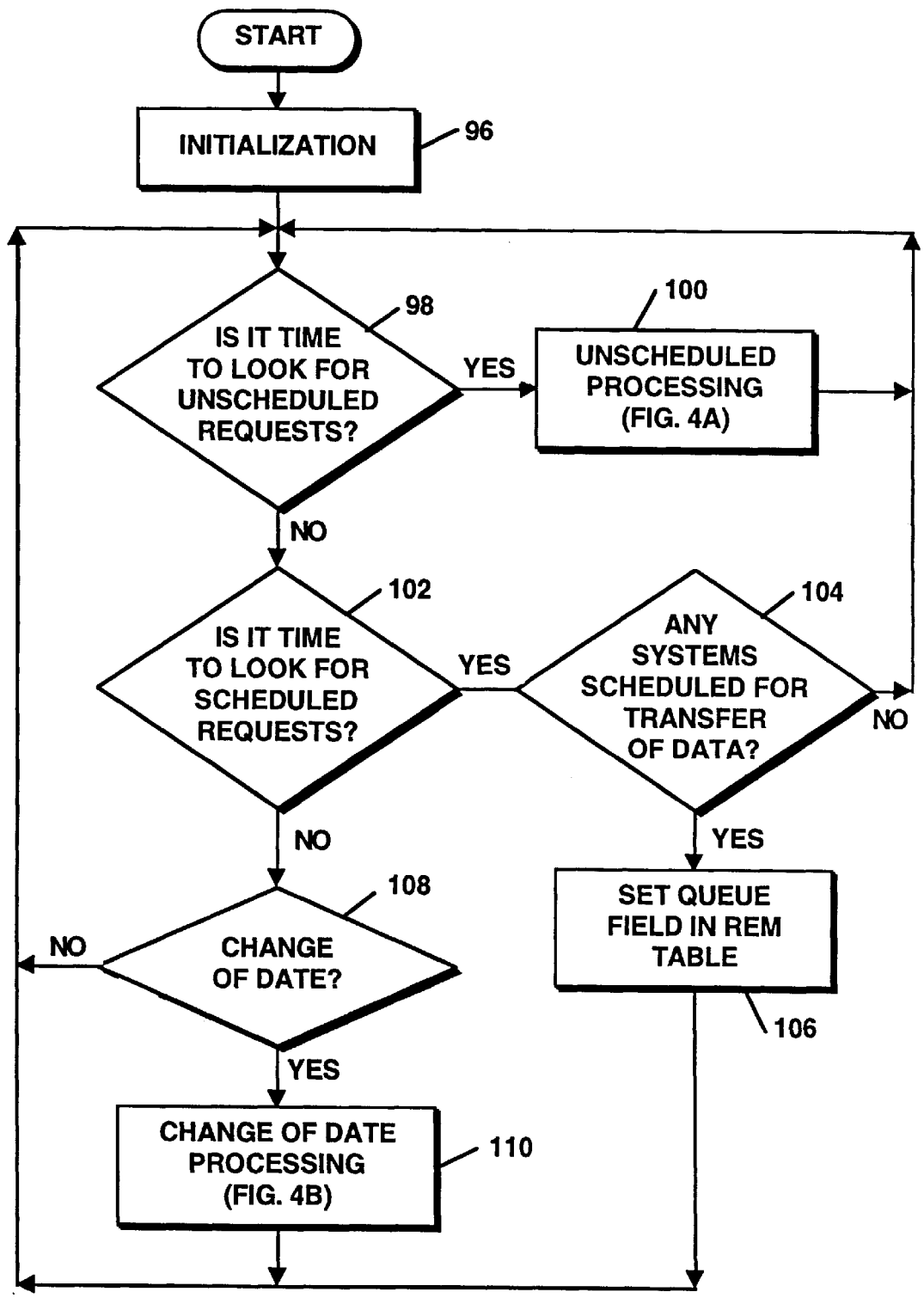
FIGS. 4, 4A, and 4C are exemplary flow diagrams of processing steps performed by a scheduler forming a portion of the centralized audiotext polling system shown in FIGS. 1 and 2.

Referring now to FIG. 4, the processing performed in CAPS 40 to update the scheduled and unscheduled databases 72,74, and REM table 95 is shown. Processing begins in initialization step 96, at which time variables utilized in the processing flow are set to predetermined values. Processing then flows to decision block 98 to read the time to determine whether CAPS should check if any unscheduled data transfer requests have been made. If it is time, then processing proceeds to block 100 where the unscheduled processing takes place. The details of the unscheduled processing steps will be explained in detail below in conjunction with FIG. 4A. After the unscheduled processing is complete, processing again returns to step 98. If in decision block 98 a decision is made that it is not time to check for unscheduled data transfer requests, then it is determined whether it is time to look for scheduled data transfer requests as shown in decision block 102. If the decision is made that it is time to look for scheduled requests, then processing flows to decision block 104 where a decision is made as to whether any systems are scheduled for transfer of data. Such decision is made by examining the REM table 95. Thus, if the day is Friday and the time is 0500, then processing flows to step 106 where the Queue field in the REM table is set to a predetermined value. The details of the Queue field in the REM table will be described below in conjunction with FIG. 5. If in decision block 104 a decision is made that no systems are scheduled for transfer of data and processing proceeds again to step 98 as shown.

If in decision block 102 a decision is made that is not time to look for scheduled requests, then processing flows to decision block 108 where it is determined if a change of date has occurred. If a change of date has not occurred then processing returns to step 98 as shown. If a change of date has occurred then processing goes to step 110 where a change of date processing occurs. The change of date processing will be described in detail below in conjunction with FIG. 4C.

Figure 4A:
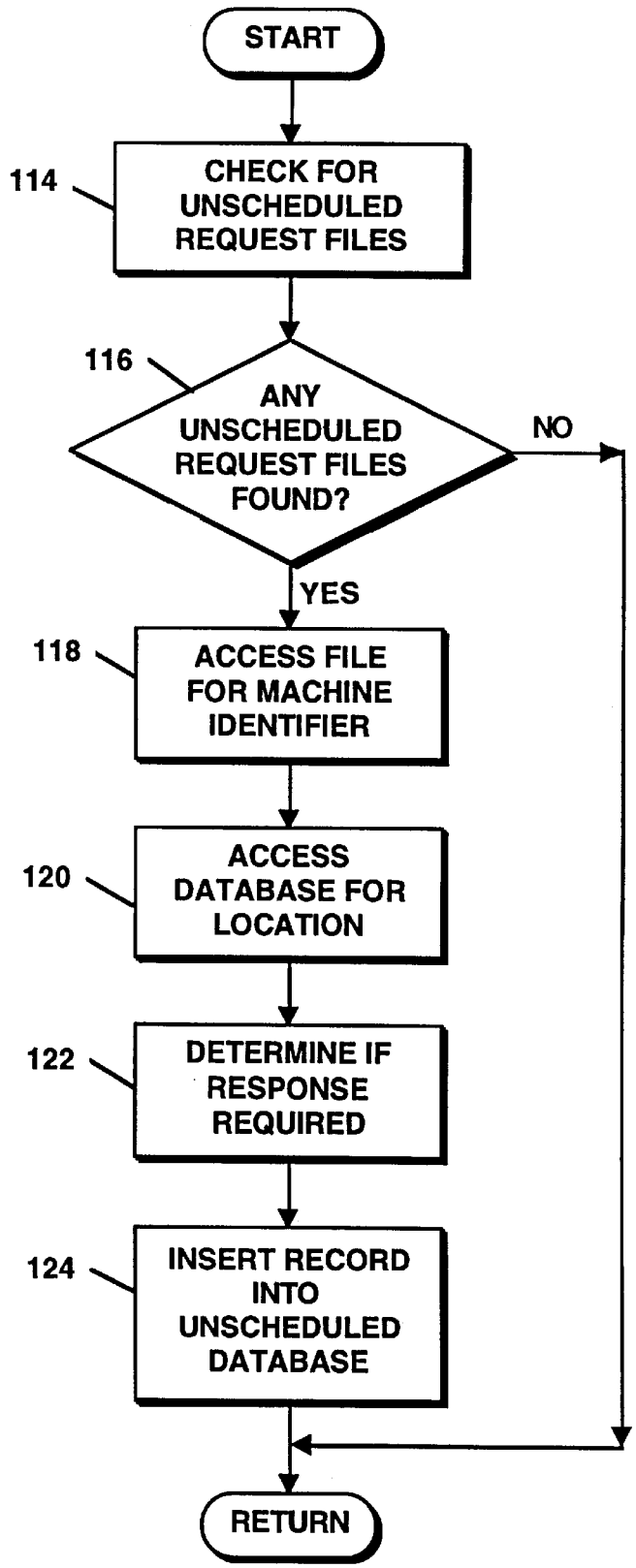

FIG. 4A shows a flow diagram of unscheduled data transfer request processing performed in CAPS 40. Processing begins with step 114 where a check for unscheduled data transfer request files is performed. CAPS 40 examines a designated network location on the server, for example, to look for such files. Processing then flows to step 116 where determination is made as to whether any unscheduled request files were found. If no unscheduled request files were found, then processing ends.

If on the other hand unscheduled request files are found in the designated location, then pressing flows to step 118 where the request file is accessed and a machine identifier is extracted from the request file. It should be noted that in this particular embodiment, step 114 is accomplished by examining three particular directories on the network server. In these particular directories files having predetermined extensions are sought out. In this particular embodiment the files are provided having extension ".ord", ".pin", and ".can". Once the machine identifier is found, processing flows to step 120 where the scheduled database is accessed using the machine identifier to determine the location information. As mentioned above, the location information corresponds to a network location or a telephone number used for a dial-up modem to access the particular ATS system. Processing next flows to step 122 where it is determined if a response is required in step 124 where a record is inserted into the unscheduled database. Processing then returns to step 98 as shown in FIG. 4.

It should be noted that after step 124, a table such as table 126 shown in FIG. 4B is completed. Table 126 includes an order file column 127 a location column 128, a return directory column 129, a Queue column 130, a retries column 131 and a remote flag column 132.

Figure 4C:
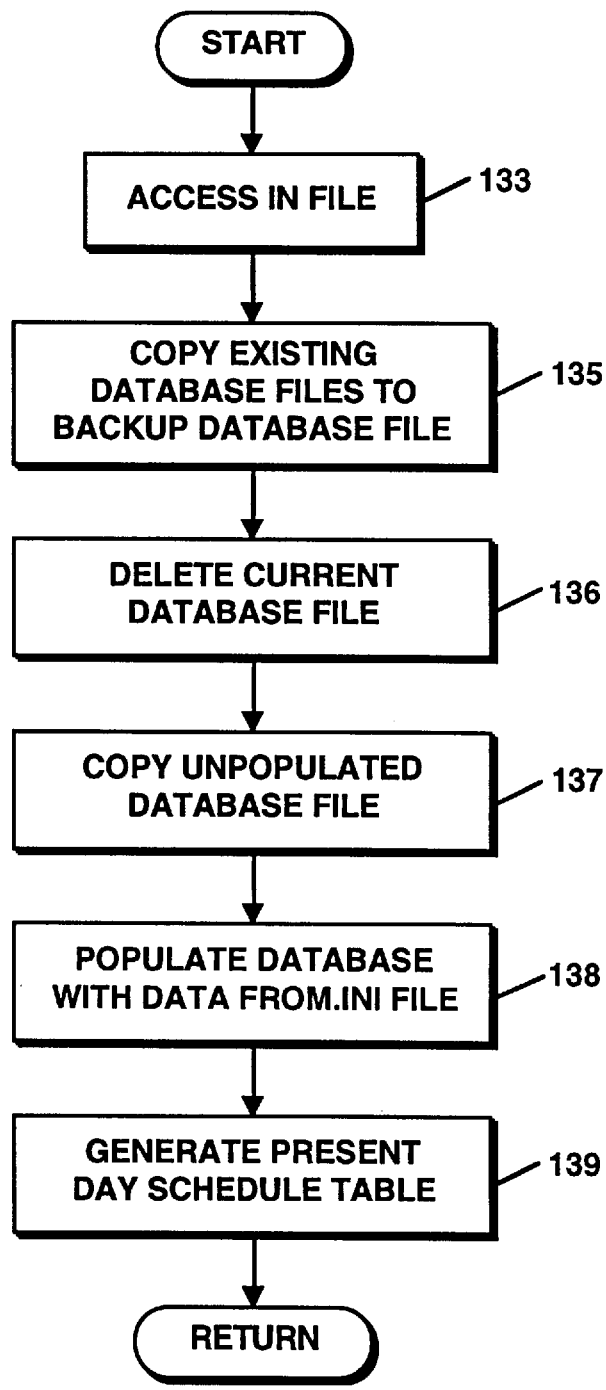

FIG. 4C shows a flow diagram of the processing performed in CAPS 40 to update database files in response to a change of date. Processing begins in step 133 where the system can access a file referred to as an ".INI" file provided by the APIS 22. As mentioned above, the .INI file contains scheduled data transfer requests. Processing proceeds in step 135 where the existing database files are copied to a backup database location. Processing then flows to step 136 where the current database file is deleted and step 137 where an unpopulated, or "clean", database file is copied from a designated network location. In step 138, the unpopulated database file is populated with the data from the .INI file received from the APIS 22. In step 139, a REM table which shows a table for that particular day is generated, as discussed above. The REM table acts as a working copy of the scheduled data transfer request information. In the REM table, the number of retries is set to a predetermined number of three and the queue field is set to a predetermined value such as zero, which indicates that there is no data transfer request scheduled for the particular machine.

Figure 5:
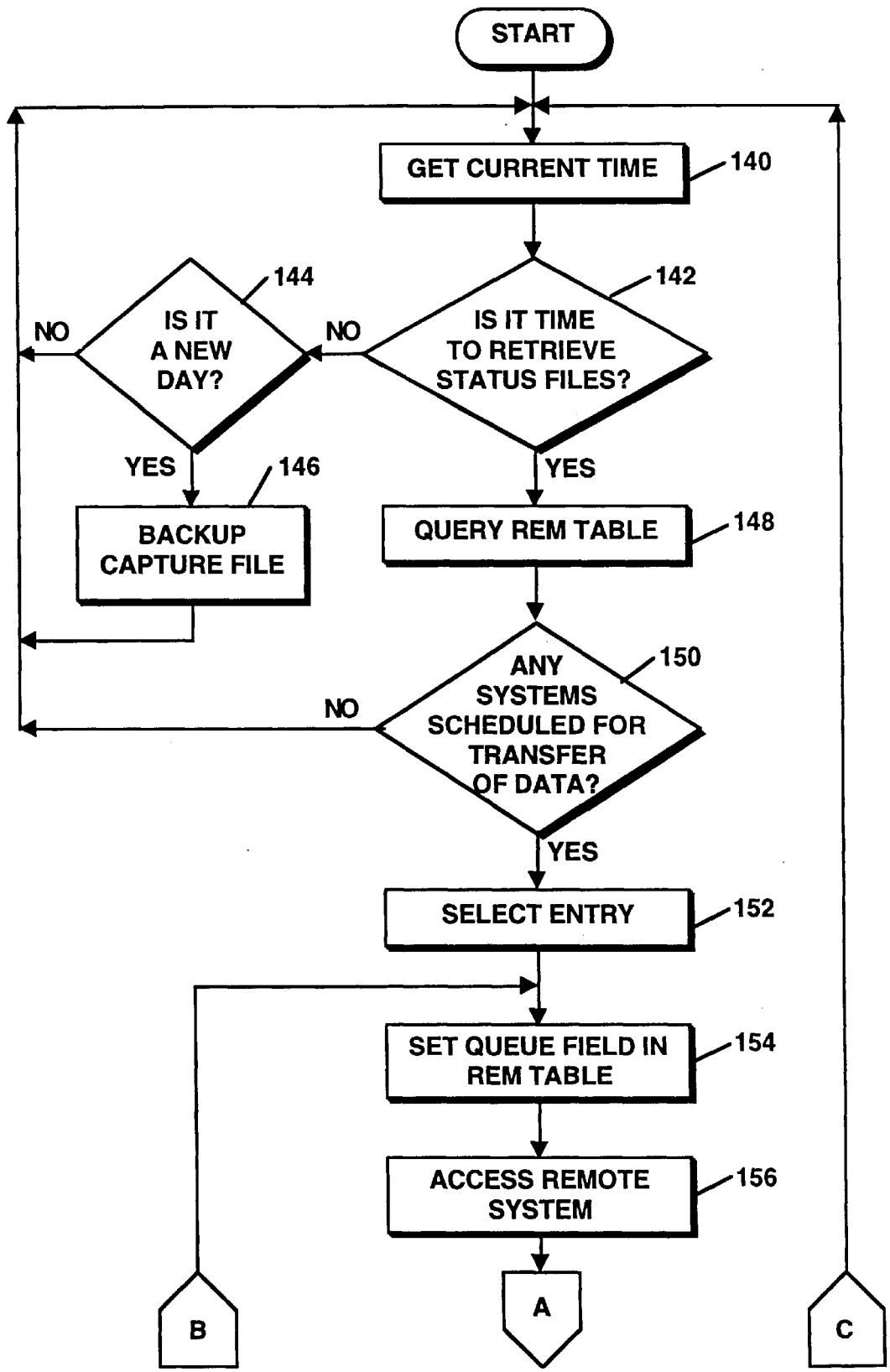
FIGS. 5 and 5A are exemplary flow diagrams of processing steps preformed by a file transfer system forming a portion of the centralized audiotext polling system shown in FIG. 2.
Figure 5A:
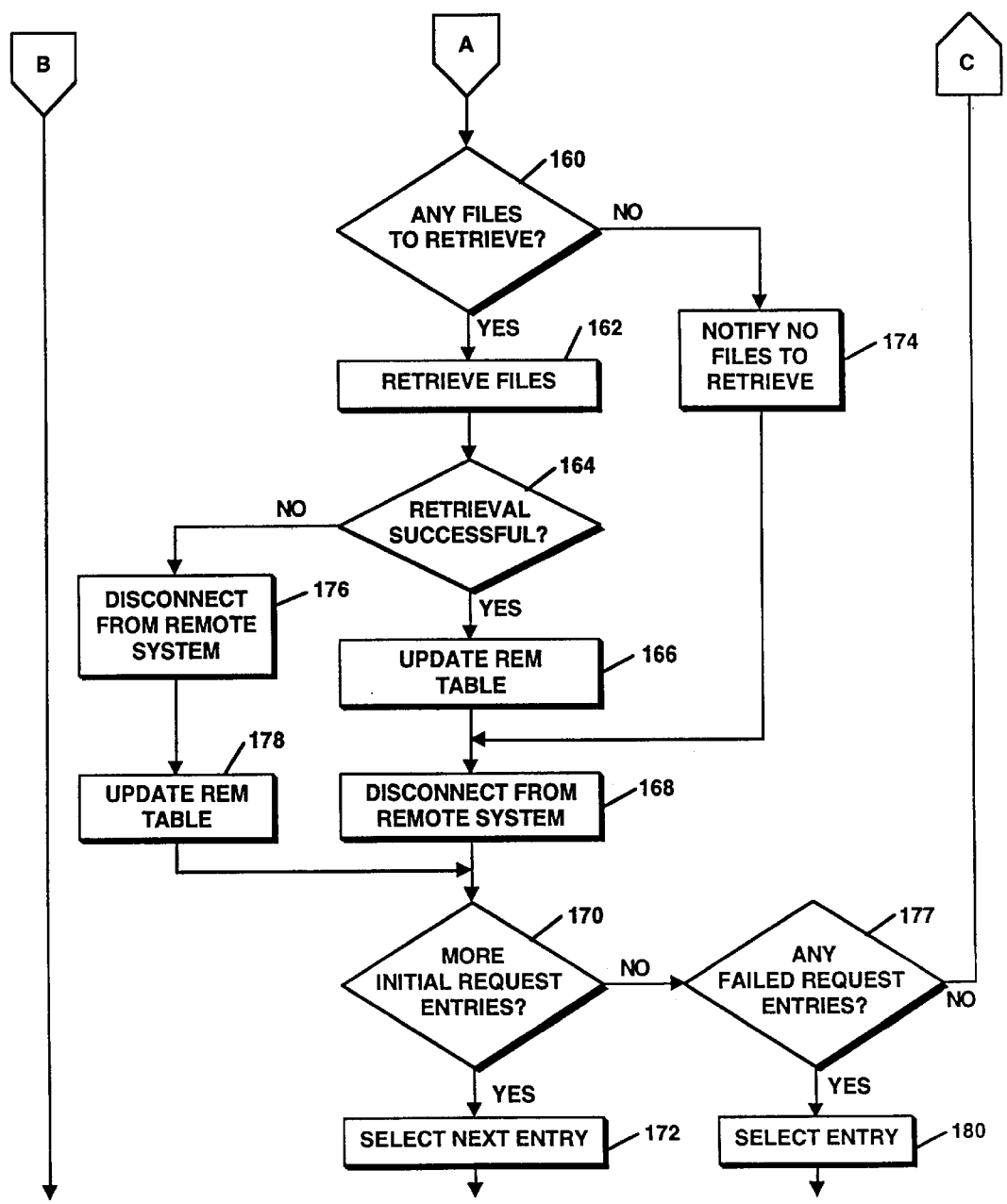

Referring now to FIG. 5, a flow diagram of the processing performed in CAPS 40 to transfer files between the ATS System and the Network Server 38 (FIG. 1) is shown. Processing begins in step 140 where a current system time is retrieved. Processing then proceeds to decision block 142 where the retrieved time is used to determine whether it is time to retrieve status files. If the decision is made it is not yet time to retrieve status files, then processing flows to decision block 144 where decision is made as to whether it is a new day. If a decision is made that it is not a new day, then processing returns to step 140. If, on the other hand, a decision is made that a new day has occurred (i.e. that the system date has changed) then processing flows to step 146 where transfer data that was captured is stored in a backup file and processing then returns to step 140 where a new current time is retrieved.

If in the decision block it is determined that it is time to check if there are scheduled data transfers, i.e., get status files, then processing flows to step 148 where a REM table is queried to determine if any systems are scheduled for transfer of data at that date and time. As shown in decision block 150, if it is determined that no systems are scheduled for transfer of data at that time, then processing flows back to step 140 and a current time is again retrieved. If, however, in decision block 150 a decision is made that it is time to transfer data, then as shown in step 152 an entry is selected and the corresponding Queue field in the REM table is set to a predetermined value. In this particular embodiment, the Queue field is set to a value of 2 indicating that information is being retrieved from the ATS System whose entry was selected in step 152. Processing then flows to step 156 where CAPS accesses the remote ATS System. Such access is accomplished, for example, by utilizing one of a plurality of dial-up modems in a modem bank, such as modem bank 46, shown in FIG. 1. In one embodiment, there are multiple instances of the file transfer system, wherein each such instance corresponds to a particular serial com port, which can be in communication with a respective modem.

Processing then flows to decision block 160 where a decision is made as to whether there are any files to retrieve from the remote system, i.e., are there any status files. If a decision is made that files exist, then processing flows to step 162, where the files are retrieved and processing then flows to decision block 164 where it is determined whether the retrieval of the files was successfully concluded. If decision is made that the retrieval was successful, then processing flows to step 166 where the scheduled database, or REM table, is updated and step 168 where the CAP System 40 disconnects from the remote ATS System.

Processing then flows to decision block 170 where a decision is made as to whether any more initial requests exist in the database. If more initial requests exist in the database, then processing flows to step 172 where the next entry is selected and then processing returns to step 154 (FIG. 5).

If in decision block 160 a decision is made that no files are available for retrieval, then processing flows to step 174 where notification can be sent to the APIS that no files are available for retrieval. After step 174, processing flows to step 168 and processing resumes as discussed above. In decision block 170, if decision is made that no more initial request entries exist, then processing flows to decision block 177 where it is determined whether any entries exist where retrieval of the file was unsuccessful. If such entries exist, then processing flows to step 180 where such an entry is selected and processing then returns to step 154 as shown. If in decision block 177 decision is made that no entries with failed requests are in existence, then processing flows back to step 140 as shown.

In step 164 if decision is made that the retrieval was unsuccessful, then processing flows to step 176 where CAPS disconnects from the remote system by terminating the dial-up modem connection. The database is updated in step 178 to indicate that a request exists but that an attempt to retrieve files was unsuccessful. In an exemplary embodiment, the number of retries in the REM table is decremented.

Figure 6:
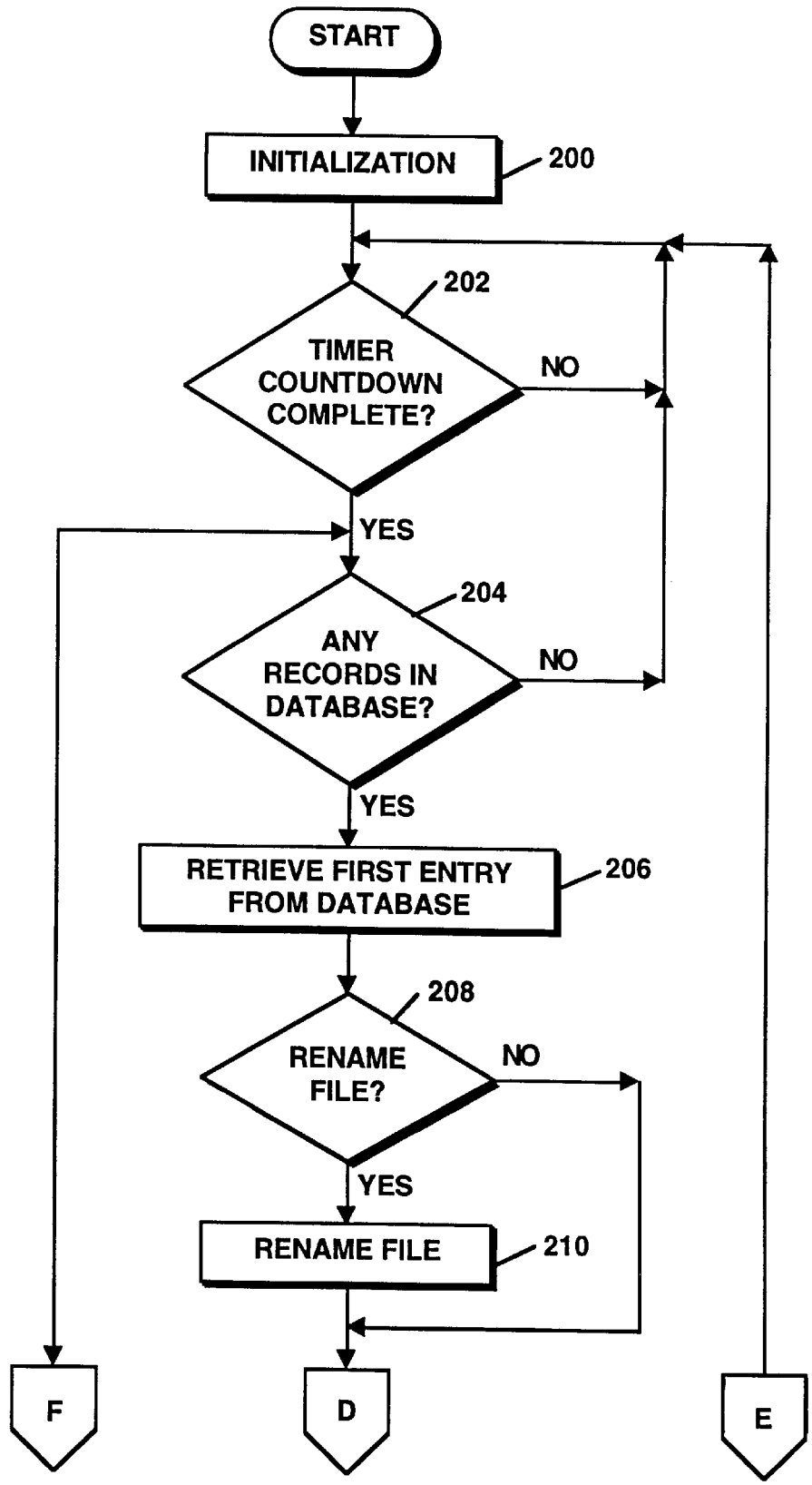
FIGS. 6–6C are exemplary flow diagrams for processing steps performed by an unscheduled request handler shown in the centralized audiotext polling system shown in FIG. 2.
Figure 6A:
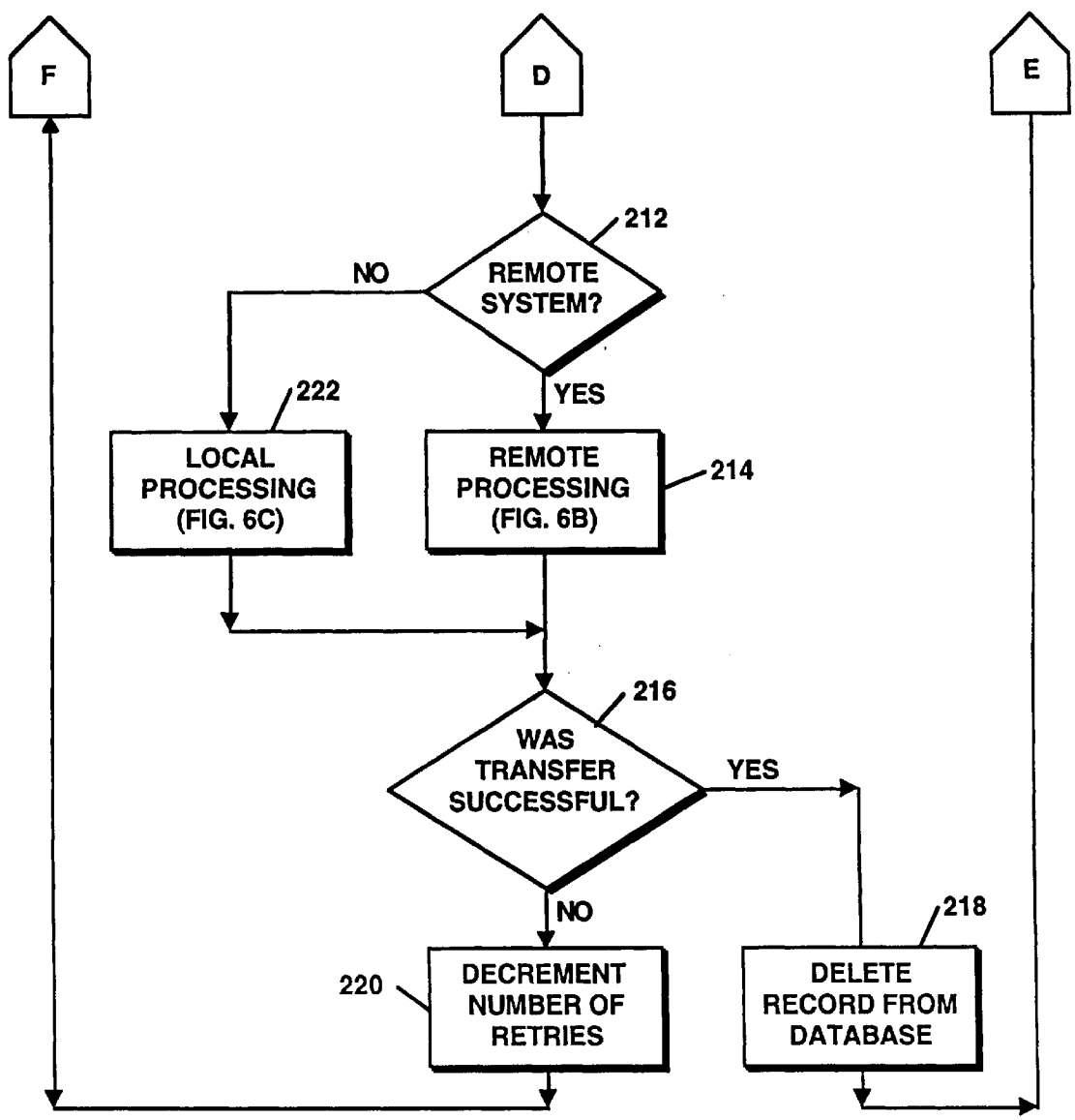
Figure 6B:
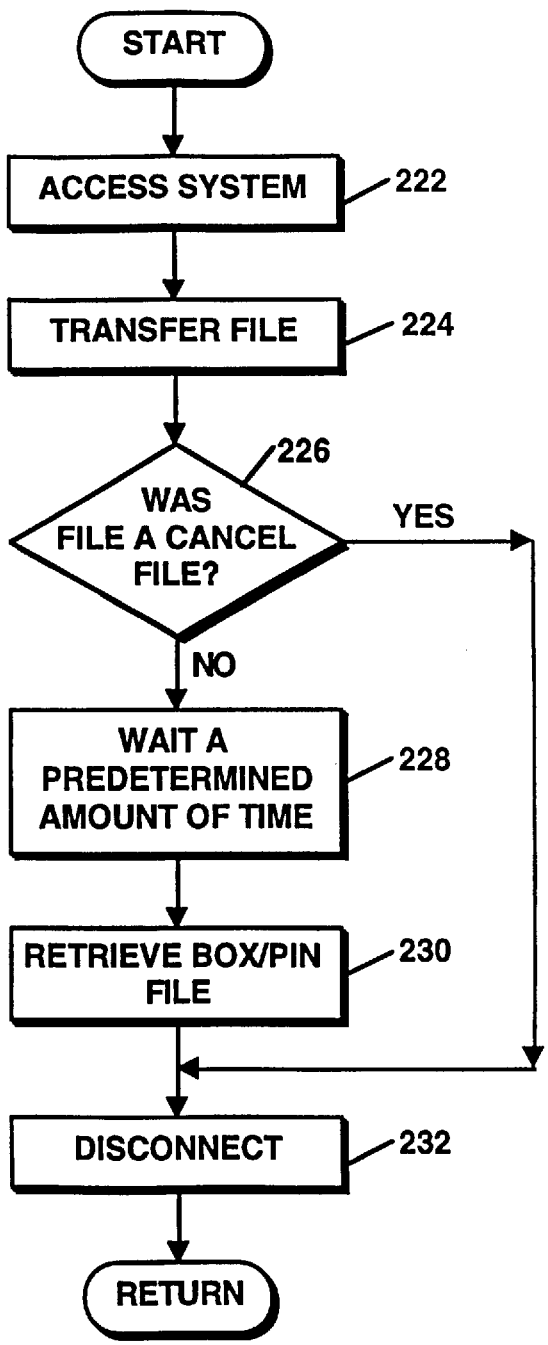

Referring now to FIG. 6, a flow diagram of the processing performed to process data transfer of unscheduled requests is shown. This process flow illustrates the ability of the CAP System 40 to act as a "traffic cop" for local systems, as well as transfer data with remote ATS. As shown, processing begins in step 200 where an initialization procedure is performed. Processing then flows to step 202 where a timer countdown is examined to determine if a predetermined amount of time has passed. If a predetermined amount of time has not yet passed, then it is not time to query the database for unscheduled requests, thus processing flows back to the beginning of step 202 as shown. If, on the other hand, a predetermined amount of time has passed, then processing flows to decision block 204 as shown. The predetermined amount of time may be selected in accordance with a variety of factors including but not limited to the amount of system data traffic flow. The predetermined amount of time may be selected, for example, to be one minute, five minutes, ten minutes or one hour or once a day. In decision block 204, if a countdown is complete, then a determination is made if any records, or entries, exist in the unscheduled database. If no records exist in the database, then there are no records to process and thus processing returns to step 202 as shown. If, on the other hand, records exist in the database of unscheduled requests, then processing flows to step 206 where the first entry is retrieved from the database. Processing then flows to step 208 where it is determined whether the retrieved file should be renamed. If the retrieved file should be renamed, then processing flows to step 210 and the file is renamed. Otherwise processing flows directly to step 212 (FIG. 6A) where a determination is made as to whether the system is a remote system or a local system. If the decision is made that the system is remote, then processing flows to step 214 and the remote processing illustrated in FIG. 6B is performed. If, on the other hand, decision is made in block 212 that the system is not remote (i.e., that the system is local), then processing flows to processing step 222 where the local processing is performed. The local processing will be described in detail in conjunction with the FIG. 6C. Regardless of whether local or remote processing is performed, processing then flows to step 216 where it is determined whether files were successfully transferred to the local network server. If in decision block 216 decision is made that the file transfer was successful, then the processing flows to step 218 and the record is simply deleted from the unscheduled database and processing returns to step 202 as shown. If, on the other hand, the file transfer was not successful, then processing flows to step 220 where the number of retries for transfer are decremented and processing flows back to step 204 where the records are again processed.

Referring now to FIG. 6B, the processing shown to process files in remote ATS Systems begins with step 222 where the systems are accessed via dial-up modem. It should be noted in the description of FIG. 6 above that the files are renamed because the ATS System always looks for a file with a particular extension. In this particular example the extension is ".ORD". The ATS System examines the file contents to determine what action to take.

Referring again to the description of FIG. 6B, once the appropriate ATS System is accessed, then processing flows to step 224 where file transfer begins. Processing then flows to decision block 226 where it is determined whether the file was a cancel file. If the file transferred was a cancel file (i.e., a file having an extension of ".CAN", to cancel boxes for example), then processing flows to step 232 and the dial-up modem disconnects from the ATS System. It is unnecessary to process or wait for a response for any file having an extension .CAN.

If in decision block 226 it is determined that the file was not a ".CAN" file, then the system should wait for a response and as shown in step 228, the system waits a predetermined amount of time for a response. If there is no response within the predetermined amount of time, then the transfer is flagged as a failure and the number of retries is decremented. Processing then flows to step 230 where a box or pin file is retrieved from an appropriate directory and processing then flows to step 232 where the dial-up modem is disconnected and processing flows back to step 216 in FIG. 6A.

Figure 6C:
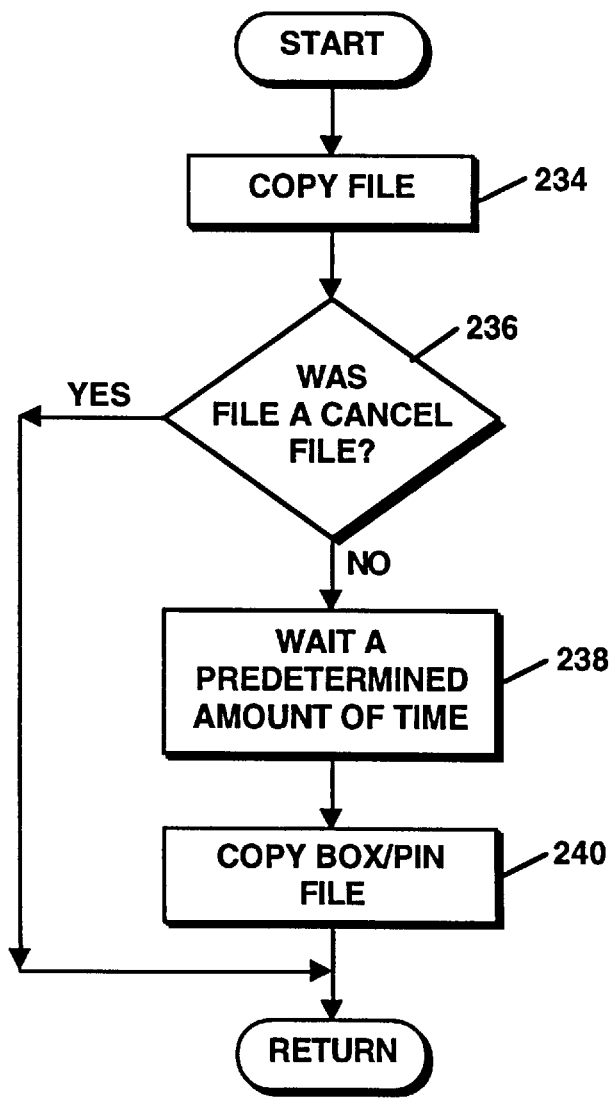

Referring now to FIG. 6C, the processing shown to process files from local ATS Systems begins with step 234 where the local file is copied and processing then proceeds to decision block 236 where it is determined whether the file was a cancel file (i.e., a file having an extension ".CAN"). If decision is made that the file was a cancel file, the processing returns to step 216 in FIG. 6A.

If, on the other hand, decision is made that the file was not a cancel file, then processing proceeds to step 238 where the system waits a predetermined amount of time for a box or pin number file created on the hard drive of a respective local ATS to be stored in a particular directory. Processing then proceeds to step 240 where the box or pin number file is copied into a designated network location.

Thus, scheduled and unscheduled data transfer requests are processed by storing the requests in respective scheduled and unscheduled databases. By storing the requests in this way, each of the local and remote requests can be processed and completed in an orderly and reliable manner for a plurality of local and remote data storage devices.

Figure 7:
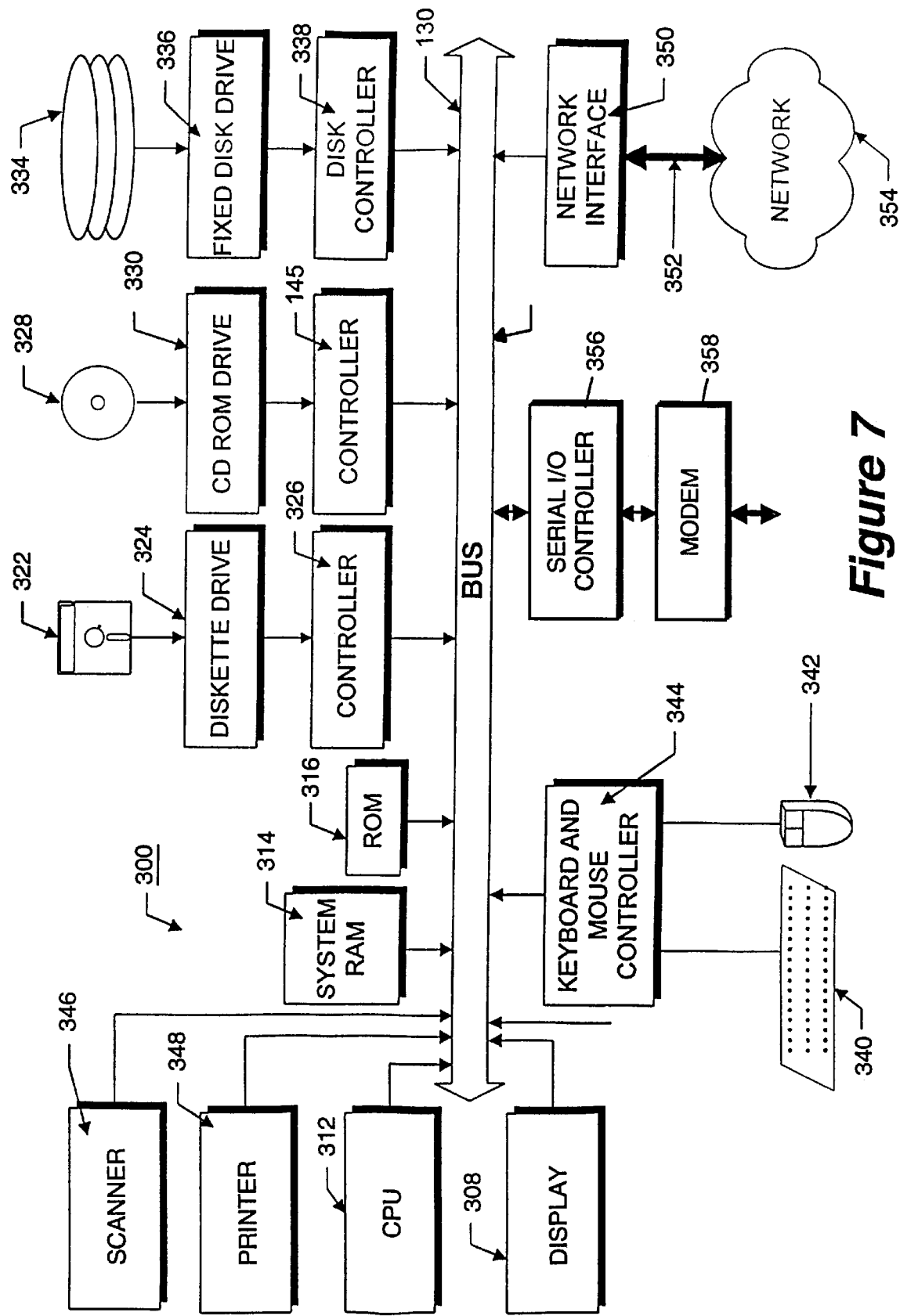
FIG. 7 is a block diagram of a computer system adapted for use with the data transfer system of the present invention.

Referring now to FIG. 7, a computer system 300 on which the invention may be implemented is shown. Computer system 300 may be provided, for example, as an IBM compatible computer or any other equivalent computer system. The exemplary computer system 300 of FIG. 7 is for descriptive purposes only. Although the description may refer to terms commonly used in describing particular computer systems, the description and concepts equally apply to other processing systems, including systems having architectures dissimilar to that shown in FIG. 7.

Computer system 300 includes a central processing unit (CPU) 302, which may be provided, for example, as a conventional microprocessor, a random access memory (RAM) 304 for temporary storage of information, and a read only memory (ROM) 306 for permanent storage of information coupled to a bus 320. Operation of computer system 300 is generally controlled and coordinated by operating system software, such as Windows 95. The operating system controls allocation of system resources and performs tasks such as processing, scheduling, memory management, networking, and I/O services, among things. Thus, an operating system resident in system memory and executed by CPU 302 coordinates the operation of the other elements of computer system 300.

Also coupled to bus 320 is a non-volatile mass storage device which may be provided as a diskette 322. Diskette 322 is insertable into a diskette drive 324 which is, in turn, coupled to bus 320 by a controller 326. Similarly, a compact disc (CD) ROM 328 is insertable into a CD ROM drive 330 which is, in turn, coupled to bus 320 by a controller 328. A hard disk 334 is typically provided as part of a fixed disk drive 336 which is coupled to bus 320 by a disk controller 338. A serial I/O controller 356 is coupled to the bus 320 and a modem 358 is coupled to the serial I/O controller. The modem 358 can provide modem communication to a remote ATS machine 44 (FIG. 1)

Data and software may be provided to and extracted from computer system 300 via removable storage media such as diskette 322 and CD ROM 328. For example, data values generated may be stored on storage media similar to media 322, 328. The data values may then be retrieved from the media 322, 328 by CPU 302 and utilized by CPU 302. Alternatively, CPU 302 may simply store such data values in ROM 306.

Alternatively still, computer software may be stored on storage media similar to media 322, 328. Such computer software may be retrieved from media 322, 328 for immediate execution by CPU 302 or by other processors included in one or more peripherals of computer system 300 such as display 308. CPU 302 may retrieve the computer software and subsequently store the software in RAM 304 or ROM 306 for later execution. User input to computer system 300 may be provided by a number of devices. For example, a keyboard 340 and a mouse 342 are coupled to bus 320 by a controller 344.

Computer system 300 also includes a communications adaptor 350 which allows the system to be interconnected to a local area network (LAN) or a wide area network (WAN), schematically illustrated by bus 352 and network 354. Thus, data and computer program software can be transferred to and from computer system 300 via adapter 350, bus 352 and network 354.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

One of ordinary skill in the art will realize further features and advantages of the invention from the above-described embodiments. Accordingly, the invention is not to be limited by what has been particularly shown and described, except as indicated by the appended claims. All references cited herein are expressly incorporated by reference in their entirety.

What is claimed is:

1. A system for transferring data between a plurality of data storage devices, the system comprising:

a data transfer request system for requesting a data transfer between respective ones of the plurality of data storage devices;

a first database for storing a plurality of entries each corresponding to an unscheduled data transfer request;

a second database for storing a plurality of entries each corresponding to a scheduled data transfer request;

a scheduler coupled to the first and second databases for updating entries in each of the first and second databases; and a file transfer system coupled to each of the first and second databases to access the entries in each of the first and second databases and to transfer data between predetermined ones of the plurality of data storage devices.

2. The system according to claim 1, wherein the file transfer system includes a first file transfer system and a second file transfer system.

3. The system according to claim 2, wherein the first file transfer system transfers data based on entries in the first database.

4. The system according to claim 2, wherein the second file transfer system accesses the first database for data storage device information and transfers data based on entries in the second database.

5. The system according to claim 1, wherein at least one of the plurality of data storage devices is remote with respect to the system for transferring data.

6. The system according to claim 1, wherein the data transfer request system includes a first data transfer system for generating the scheduled data transfer requests.

7. The system according to claim 6, wherein the data transfer system includes a second data transfer request system, wherein the first and second data transfer request systems generate the unscheduled data transfer requests.

8. The system according to claim 1, wherein at least one of the plurality of data storage devices is an audiotext system.

9. The system according to claim 8, wherein the audiotext system stores personal ad information.

10. The system according to claim 9, wherein the data transfer request system requests data from the audiotext system, the data having at least one data element selected from the group consisting of box number, PIN number, profile data, security code, ad expiration date, and client identification.

11. The system according to claim 1, wherein the plurality of data storage devices includes a remote audiotext system and a data storage device in network communication with the data transfer request system.

12. The system according to claim 8, wherein the remote audiotext system is in modem communication with the file transfer system.

13. The system according to claim 1, wherein the data transfer request system and the scheduler are in network communication.

14. The system according to claim 1, wherein the file transfer system examines the second database for entries at predetermined time intervals.

15. The system according to claim 1, wherein the file transfer system examines the first database for entries at predetermined time intervals.

16. The system according to claim 1, wherein the scheduler examines a network location at predetermined time intervals for unscheduled data transfer requests.

17. The system according to claim 16, wherein the scheduler updates the first database with unscheduled data transfer requests at the network location.

18. A method of transferring data between respective ones of a plurality of data storage devices, comprising the steps of;
   storing a plurality of entries in a first database, each of the plurality of entries corresponding to a scheduled data transfer request;
   storing a plurality of entries in a second database, each of the plurality of entries corresponding to an unscheduled data transfer request;
   updating the entries in each of the first and second databases;
   transferring data from the respective ones of the plurality of data storage devices based on the entries in the first and second databases.

19. The method according to claim 18, wherein the step of storing a plurality of entries in a first database further includes obtaining the scheduled data transfer requests from a data transfer request system.

20. The method according to claim 18, wherein the step of updating the entries includes examining a network location to determine if there are unscheduled data transfer requests.

21. The method according to claim 20, wherein the step of updating the entries further includes the step of updating the second database with the unscheduled data transfer requests at the network location.

22. The method according to claim 18, wherein a first data transfer system transfers data based on scheduled data transfer requests and a second data transfer system transfers data based on unscheduled data transfer requests.

23. The method according to claim 18, wherein at least one of the data storage devices is an audiotext system that transfers data over a modem.

24. The method according to claim 18, wherein the step of transferring the data further includes the step of examining the second database for entries at predetermined intervals.

25. The method according to claim 18, wherein the step of transferring the data further includes examining the first database for entries at predetermined intervals.

26. The method according to claim 24, further including the step of examining a time value to determine whether the predetermined interval to examine the second database has arrived.

27. The method according to claim 25, further including the step of examining a time value to determine whether the predetermined interval to examine the first database has arrived.

28. The method according to claim 18, wherein the step of transferring data further includes the step of obtaining data storage device information from the first database and storing the information in the second database.

* * * * *